Dec. 2, 1952  A. V. COLEMAN  2,620,202
CENTER CONTROL ARM SLACK TAKE-UP
Filed March 19, 1951

Archie V. Coleman
INVENTOR.

BY Clarence A. O'Brien
and Harvey B. Jacobson
Attorneys

Patented Dec. 2, 1952

2,620,202

UNITED STATES PATENT OFFICE 2,620,202

CENTER CONTROL ARM SLACK TAKE-UP

Archie V. Coleman, Corpus Christi, Tex.

Application March 19, 1951, Serial No. 216,400

2 Claims. (Cl. 280—95)

This invention relates to an attachment for a vehicle steering assembly.

An object of this invention is to take up slack caused by normal wear between a steering idler third arm, its spindle and the third arm bracket, by means of an attachment fastened so that the open end of a sleeve thereof is in communication with one end of the spindle and a plunger located in the sleeve and under a spring load presses against the bottom of the spindle constantly forcing it upwardly to take up slack caused by normal wear between the steering idler third arm and its third arm bracket.

Ancillary objects and features of importance will become apparent in following the description of the illustrated form of the invention.

Recent model "Chevrolet" automobiles have had to be repaired to the extent of replacing steering idler third arm bushings and spindles due to rather rapid wear. The replacement of these parts is rather costly and if the objectionable effect of such wear could be overcome without replacing the bushings and spindle, a material saving would be realized. I have provided an attachment which serves this purpose.

Figure 1:
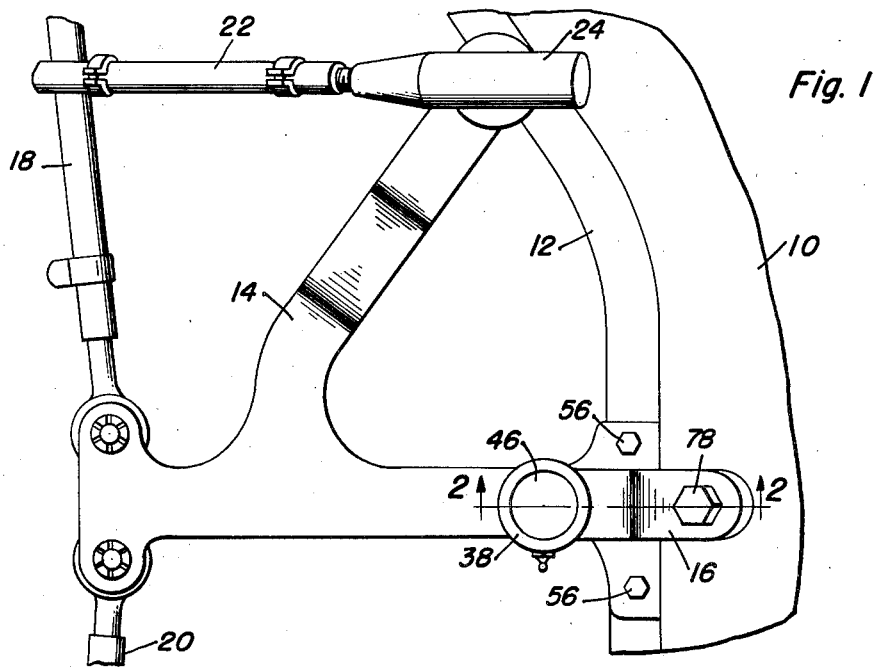
Figure 1 is a fragmentary plan view of a part of the steering assembly of at least one standard make vehicle of rather recent origin.

Attention is invited to Figure 1. I have illustrated various standard parts such as the front suspension cross member 10 forming a part of the cross member 12 of the vehicle, the steering idler third arm 14, third arm mounting bracket 16, tie rods 18 and 20 and sleeve 22 which is connected by a suitable, standard end assembly to the steering box shaft and also by a standard end assembly 24 to a part of the steering idler third arm. All of this structure is standard, constituting a part of recent model "Chevrolet" automobiles. It is to be noted from inspection of Figure 1 that the weight of tie rods 18 and 20 together with the weight of the steering idler third arm 14, sleeve 22 with its ends 24 is all borne by the bearing 26 at one end of the steering idler third arm. Therefore, the shims 28 and 30 wear rather rapidly and the bearing 26 itself and even the pin or spindle 32 wear rather rapidly. Moreover, the bushings 34 and 36 which are located in the third arm bracket upper and lower members 38 and 40 wear entirely too rapidly for satisfactory performance of the steering assembly of the vehicle.

The theory of the invention is to take up slack as it occurs between the spindle 32 and bushings 34 and 36 and between the bearing 26 and its shims 28 and 30. To accomplish this the lower Welch plug is removed from its recess 44, the lower Welch plug being identical to the upper plug 46 which is seated in its recess 48. Then the sleeve 50 is fitted under the spindle 32 with the shoulder 52 at the upper open end of the sleeve 50 being fitted in the recess 44 wherein the Welch plug formerly seated. The sleeve 50 has a mounting bracket 54 fixed to one side thereof, this mounting bracket being adapted to be bolted or otherwise rigidly fastened to the frame cross member 12 either by the bolts 56 which mount the third arm brackets or other bolts. There is a plunger 58 which includes a shank 60 and a head 62, located in the bore of the sleeve 50, the head bearing against the bottom surface of the spindle 32 inasmuch as the open end of the sleeve is in confronting relationship with the lower end of the spindle 32. A suitable yielding means, as the spring 64, is disposed in the sleeve 50 having its lower end located on a plug 68 which constitutes a seat for the spring and having its upper end bearing against the under surface of the head 62 of the plunger 58.

The sleeve 50 is internally threaded, as at 70, and the plug 48 is provided with suitable threads to match therewith. Accordingly the plug is adjustable in the sleeve so as to press the head 62 of the plunger against the bottom of the spindle 32 and to assure that the spring 64 is placed under compression. One or more apertures 72 are provided in the sleeve in order to accommodate a standard cotter pin 74 which fits in a downwardly opening notch 76 in the plug 68 thereby preventing it from rotating and hence working loose from the sleeve 50.

Figure 2:
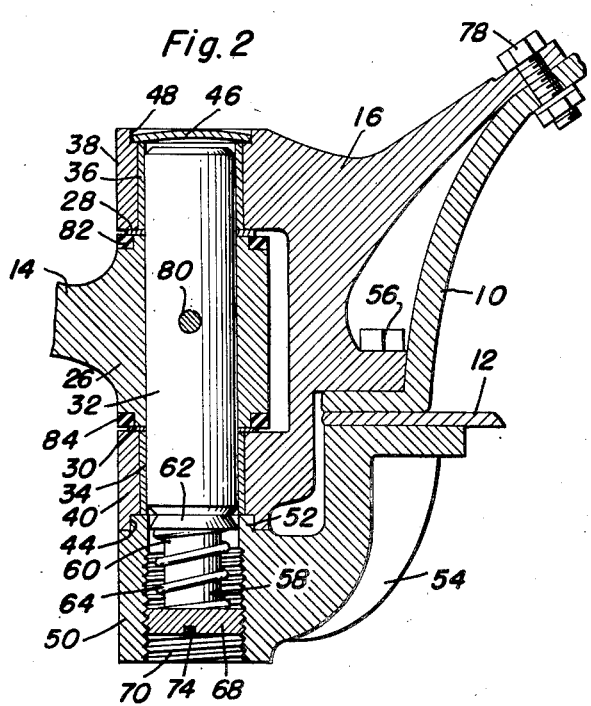
Figure 2 is an enlarged sectional view taken on the line 2—2 of Figure 1 and in the direction of the arrows.
Figure 3:
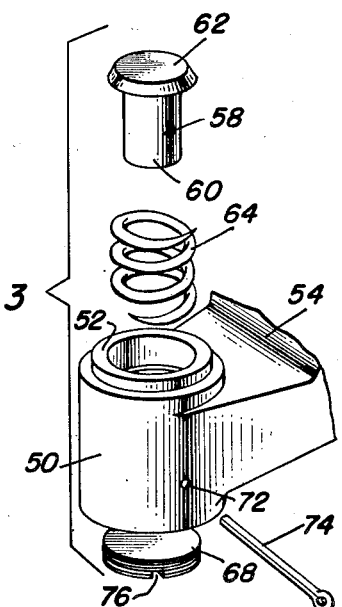
Figure 3 is an exploded fragmentary perspective view of the attachment.

As noted from inspection of Figure 2, the third arm bracket 16 is fastened by means of the bolt 78 to the front suspension cross member 10 in order to hold it stationary and the spindle 32 is held fixed to the steering idler third arm 14 by means of a pin 80 which fastens through aligned openings in the spindle 32 and the bearing 26. Standard gaskets 82 and 84 are provided in appropriate recesses of the bearing 26 to serve their usual function. In operation, the sleeve 50 is fitted on the vehicle as previously described and constantly forces the spindle 32 upwardly by a yielding force of the spring 64 when wear occurs in the bushings, shims 28 and 30 and the bearing 26. After excessive wear, instead of a costly repair which involves a replacement of the bushings 34 and 36 among other parts, the plug 68 may be adjusted upwardly a slight amount thereby moving the plunger 58 upwardly against the bottom of the spindle 32 and thereby moving the spring 64 with it. Although I have illustrated a bracket 54 as the preferred means of attaching the sleeve 50 in alignment with the spindle 32, the sleeve 50 may be formed without the bracket 54 and simply spot welded to the bottom part of the third arm bracket. Other standard means of fastening the sleeve 50 in place may be resorted to.

Having described the invention, what is claimed as new is:

1. Slack take-up means for the spindle of a steering idler arm wherein the spindle is rotatably journaled in a mounting bracket, said mounting bracket having an internal annular shoulder at the lower end thereof; said slack take-up means comprising a sleeve having a reduced end portion adapted to abut the mounting bracket shoulder, a plunger disposed in said sleeve and having an enlarged head adapted to abut the lower end of the spindle, adjustable means disposed in said sleeve and engaging the lower end of said plunger to adjustably retain the same in said sleeve, a spring surrounding said plunger and seating at its ends against said plunger head and said plug to bias the plunger head into engagement with the lower end of the spindle and means retaining said sleeve on said mounting bracket.

2. The combination of claim 1 wherein said adjustable means consists of said sleeve being internally threaded, and a plug threaded in said sleeve abutting said plunger.

ARCHIE V. COLEMAN.

REFERENCES CITED

The following references are of record in the file of this patent:

UNITED STATES PATENTS

| Number | Name | Date |
|---|---|---|
| 2,083,627 | Youngren | June 15, 1937 |
| 2,159,344 | Slack | May 23, 1939 |

FOREIGN PATENTS

| Number | Country | Date |
|---|---|---|
| 321,312 | Great Britain | Nov. 7, 1929 |
| 758,122 | France | Jan. 11, 1944 |
| 806,438 | France | Dec. 16, 1936 |